No. 613,782.　　　　　　　　　　　　　　　　　　　　Patented Nov. 8, 1898.
R. J. & J. F. SCHNEIDER.
CLINOMETER.
(Application filed Apr. 30, 1897.)

(No Model.)

Witnesses
John Rennie

Inventors
Rudolph J. Schneider
John F. Schneider
By their Attorneys,
C. A. Snow & Co.

THE NORRIS PETERS CO., PHOTO-LITHO., WASHINGTON, D. C.

UNITED STATES PATENT OFFICE.

RUDOLPH J. SCHNEIDER, OF POTTSVILLE, AND JOHN F. SCHNEIDER, OF MUIR, PENNSYLVANIA.

CLINOMETER.

SPECIFICATION forming part of Letters Patent No. 613,782, dated November 8, 1898.

Application filed April 30, 1897. Serial No. 634,596. (No model.)

*To all whom it may concern:*

Be it known that we, RUDOLPH J. SCHNEIDER, residing at Pottsville, and JOHN F. SCHNEIDER, residing at Muir, in the county of Schuylkill and State of Pennsylvania, citizens of the United States, have invented a new and useful Clinometer, of which the following is a specification.

Our invention relates to clinometers or plumb-levels, and has for its object to provide a simple and efficient device of this class whereby pitches or inclinations may be accurately measured by relation to a scale of degrees, to provide means whereby the apparatus may be applied to a surface having a double pitch or inclination without affecting the operation of the measuring devices, the inclination in one direction being measured without causing the apparatus to be affected by the other inclination, and to provide means for locking the pointer or indicator in any adjusted position, whereby the apparatus may be used under conditions in which light sufficient for reading graduations is excluded and under conditions where the surface of which the inclination is to be measured is accessible by only one hand of the operator and where the graduations could not be read with accuracy.

Further objects and advantages of this invention will appear in the following description, and the novel features thereof will be particularly pointed out in the appended claims.

Figure 1:
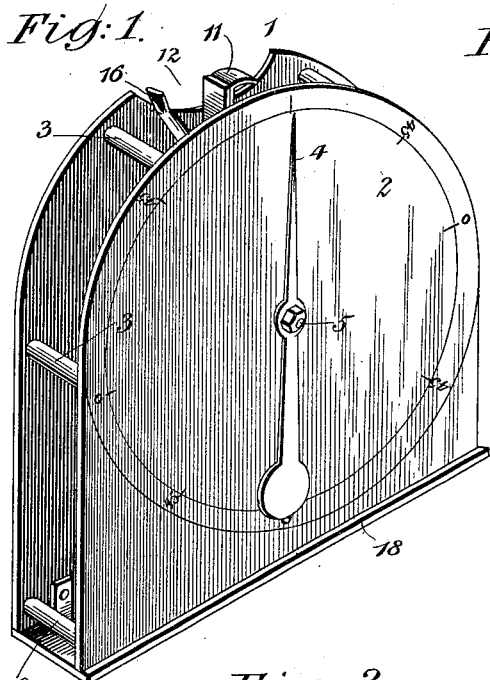
Figure 2:
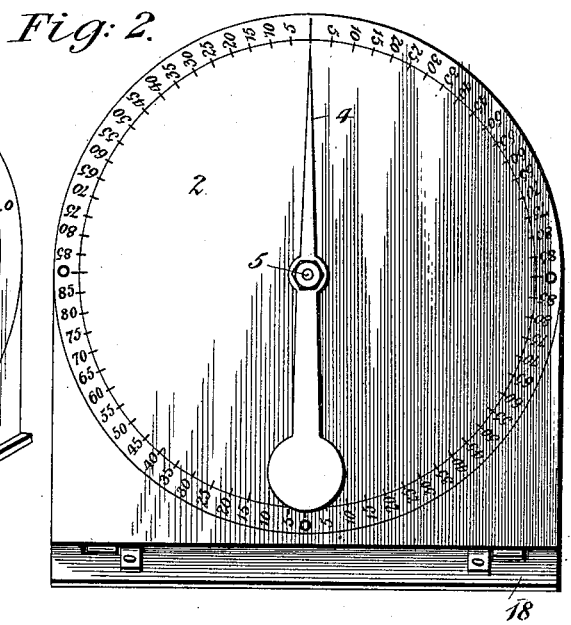
Figure 3:
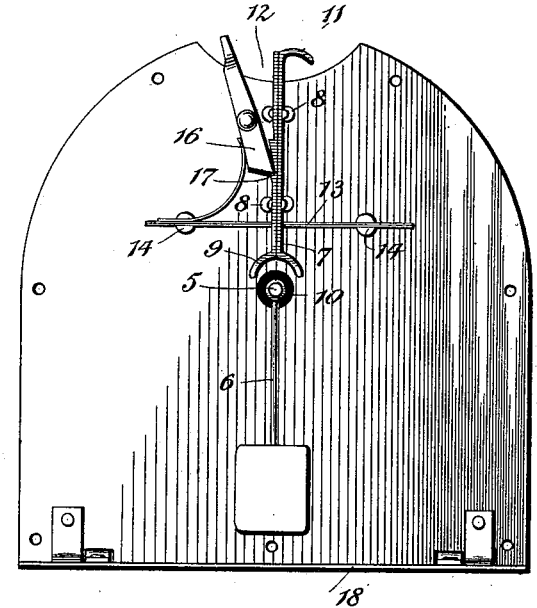
Figure 4:

In the drawings, Figure 1 is a perspective view of an apparatus constructed in accordance with our invention. Fig. 2 is a front view showing the apparatus adjusted to measure the inclination of a surface which has a double pitch or inclination. Fig. 3 is a front view with the face-plate omitted. Fig. 4 is a vertical central section.

Similar numerals of reference indicate corresponding parts in all the figures of the drawings.

The casing of the apparatus consists of a rear plate 1 and a parallel front plate 2, connected by posts 3, said front plate being provided with a scale of degrees embodying a complete circle, or three hundred and sixty degrees, and this scale or dial is traversed by a pointer or indicator 4. The spindle 5 of the pointer is mounted in alined bearings in the front and rear plates of the casing and is provided with a weighted arm 6, forming a gravitating member, to maintain the pointer normally in an upright or vertical position, while the lower side of the casing forms a straight-edge adapted to be arranged upon a surface of which the inclination is to be measured, whereby the extent of deflection of the pointer from a position perpendicular to the straight-edge indicates in degrees by reference to the dial the angular inclination of said surface.

It frequently happens in measuring inclinations or pitches, as in mines, that the dial cannot be read at the time of making the measurement or that it is desirable to preserve the measurement indicated by the pointer for subsequent reference, and hence we have found it desirable to employ a stop mechanism for locking the pointer at any adjustment. A preferred form of stop mechanism is illustrated in the drawings and embodies a stop-arm 7, mounted to slide in alined guides 8 and provided at its inner end with a shoe 9 for engagement with a friction-surface 10 on the spindle of the pointer, said friction-surface being preferably formed by a collar of rubber or similar soft material. The stop-arm or slide is provided at its upper end with a finger-hold 11, which is exposed through a cut-away portion 12 in the rear plate of the casing, and said stop-arm is yieldingly held out of engagement with the friction-surface of the pointer-spindle by means of a spring 13, which is shown in the drawings as being terminally supported by suitable keepers 14 and being in the path of a shoulder 15 on the stop-arm. In connection with the slide is also arranged a spring-actuated locking-pawl 16, adapted to engage ratchet-teeth 17 on the slide and terminally exposed contiguous to said opening in the rear plate of the casing.

It will be understood that in operation the straight-edge of the apparatus is arranged upon the surface of which the inclination is to be measured, and when the pointer has reached a position of rest or equilibrium the stop-arm or slide is pressed down to cause its shoe to engage the friction-surface of the pointer-spindle, and said arm or slide is locked in its depressed position by the pawl and is released only when the pawl is disengaged therefrom.

In connection with the above-described mechanism we also prefer to employ an angle-leaf 18, hinged or having a suitable jointed connection with one of the plates of the casing—as, for instance, the rear plate—the joint being sufficiently tight to hold the leaf at any desired adjustment or in any desired transverse angular position. The function of this angle-leaf is to bear upon a double inclined surface and form a straight-edge for the apparatus in measuring the inclination of a surface in one direction when it has a secondary or additional pitch. For instance, a surface may have a north and south as well as an east and west pitch, such as the valley-rafters of a roof, and it frequently happens that it is desirable to measure the pitch in one direction without allowing the apparatus to be affected by the pitch in the other direction, and hence in order to insure the accurate operation of the parts it is necessary to maintain the casing in a truly upright or vertical position so far as transverse inclination is concerned. The angle-leaf makes this operation possible. It constitutes, essentially, a straight-edge which is capable of transverse angular adjustment, and hence the inclination may be measured of a timber whose sides are disposed in other than vertical and horizontal planes.

An important advantage of the locking mechanism herein described resides in its simplicity and the fact that the extremity of the locking-arm is itself exposed for pressure to apply the brake to the spindle of the pointer, thus enabling the device to be set without disturbing the pointer when, as above indicated, the measurement of an inclination is being taken in the dark or at such a point, as at arm's length, as to prevent the operator from seeing the dial. The locking mechanism consists solely of a spring-returned reciprocable locking-arm and a spring-actuated pawl for engaging said arm when in its locking position.

Various changes in the form, proportion, and the minor details of construction may be resorted to without departing from the spirit or sacrificing any of the advantages of this invention.

Having described our invention, what we claim is—

1. A leveling apparatus having a swinging leaf for contact with a surface to be leveled, the same being mounted with its axis of movement parallel with the plane of movement of the leveling device, whereby the angular adjustment of the body portion of the apparatus, to secure horizontality, does not affect the relative position of the leaf, substantially as specified.

2. A pendulum-leveling apparatus having a straight-edge mounted, at an edge parallel with the plane of movement of the pendulum, for angular adjustment in a direction transverse to the plane of said movement, substantially as specified.

3. An apparatus of the class described having a dial traversed by a gravity-actuated pointer, and provided with a straight-edge mounted, at an edge parallel with the plane of the dial, for angular adjustment in a direction perpendicular to the plane of said dial, substantially as specified.

4. An apparatus of the class described, having a dial traversed by a gravity-actuated pointer, and provided with a pivoted angle-leaf, mounted for angular adjustment, and having its axis of movement parallel with the plane of the dial, substantially as specified.

5. An apparatus of the class described, having a casing, a dial traversed by a gravity-actuated pointer, and an angle-leaf hingedly mounted upon the casing on a line parallel with the plane of the dial, for swinging movement in a plane perpendicular to that of the dial, substantially as specified.

6. An apparatus of the class described, having a dial traversed by a gravity-actuated pointer, and a stop mechanism having a terminally-exposed locking-arm mounted to slide transversely to the spindle of the pointer and provided with a shoe to engage a friction-surface on said spindle, yielding means for normally maintaining the stop-arm with its shoe out of engagement with said friction-surface, and automatic locking devices for engaging and securing the stop-arm with its shoe in engagement with the friction-surface, substantially as specified.

7. An apparatus of the class described, having a dial traversed by a gravity-actuated pointer, and a stop mechanism including a terminally-exposed stop-arm mounted to slide toward and from the spindle of the pointer and provided with a shoe to engage a friction-surface thereof, a terminally-supported return-spring 13 for normally holding the stop-arm out of engagement with said friction-surface, and automatic locking devices for engaging and securing the stop-arm in its adjusted position, a finger-hold on the stop-arm being exteriorly exposed for pressure, to move the stop-arm in opposition to the resistance of its return-spring, substantially as specified.

In testimony that we claim the foregoing as our own we have hereto affixed our signatures in the presence of two witnesses.

RUDOLPH J. SCHNEIDER.
JOHN F. SCHNEIDER.

Witnesses for R. J. Schneider:
JOSEPH WAGNER,
WM. LEINHEISER.
Witnesses for J. F. Schneider:
HIRAM BROWN,
CHRIS J. GOENCHER.